E. A. SPERRY.
CORRECTION DEVICE FOR REPEATER COMPASSES.
APPLICATION FILED MAY 17, 1917.

1,403,062.

Patented Jan. 10, 1922.
4 SHEETS—SHEET 1.

INVENTOR
Elmer A. Sperry.
BY
Herbert H. Thompson
ATTORNEY

E. A. SPERRY.
CORRECTION DEVICE FOR REPEATER COMPASSES.
APPLICATION FILED MAY 17, 1917.

1,403,062.

Patented Jan. 10, 1922.

INVENTOR
Elmer A. Sperry.
BY
Herbert H. Thompson
ATTORNEY

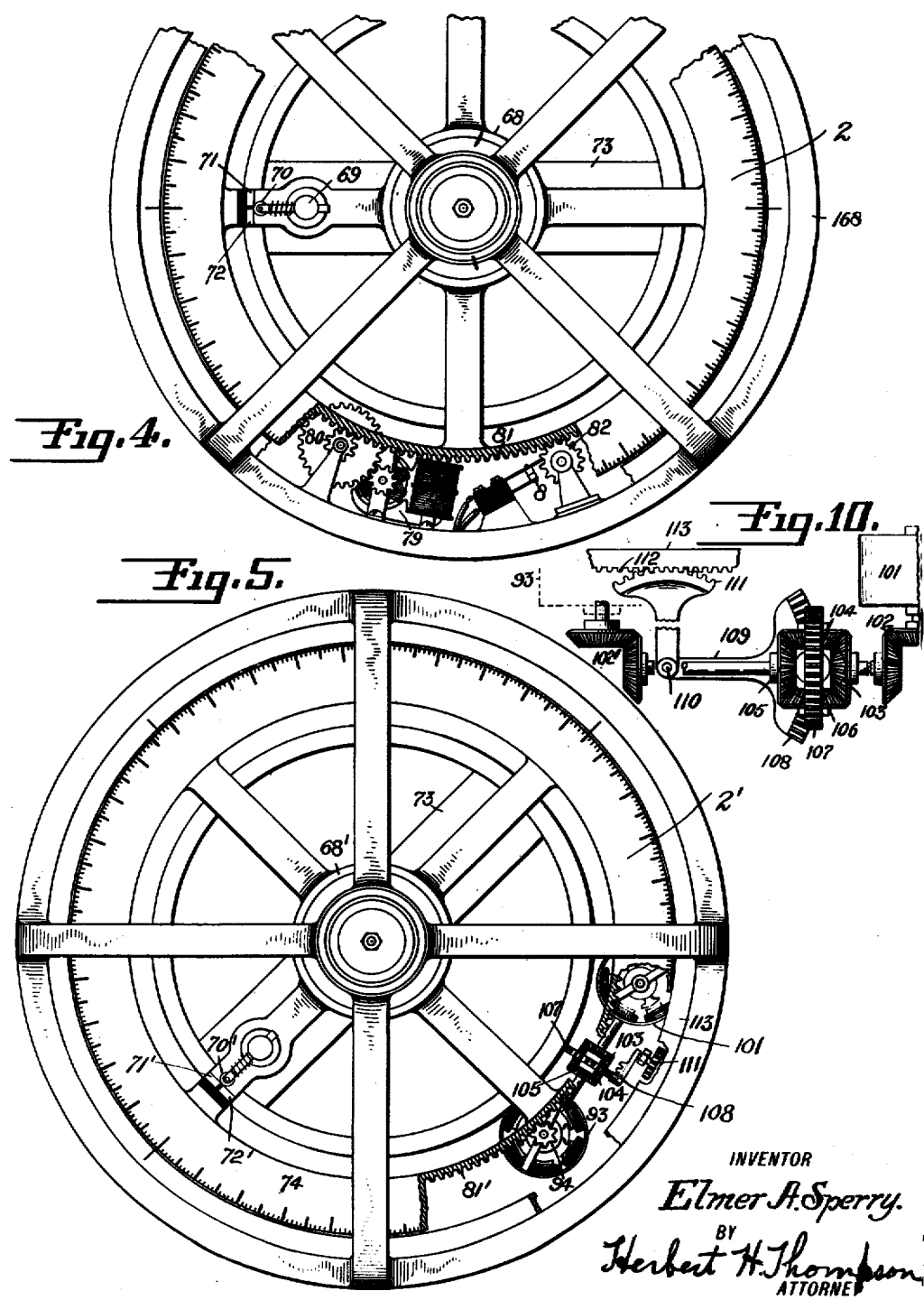

E. A. SPERRY.
CORRECTION DEVICE FOR REPEATER COMPASSES.
APPLICATION FILED MAY 17, 1917.

1,403,062.

Patented Jan. 10, 1922.

INVENTOR
Elmer A. Sperry.
BY
Herbert H. Thompson
ATTORNEY

UNITED STATES PATENT OFFICE.

ELMER A. SPERRY, OF BROOKLYN, NEW YORK, ASSIGNOR TO SPERRY GYROSCOPE COMPANY, OF BROOKLYN, NEW YORK, A CORPORATION OF NEW YORK.

CORRECTION DEVICE FOR REPEATER COMPASSES.

1,403,062. Specification of Letters Patent. Patented Jan. 10, 1922.

Application filed May 17, 1917. Serial No. 169,160.

*To all whom it may concern:*

Be it known that I, ELMER A. SPERRY, a citizen of the United States of America, residing at 1505 Albermarle Road, Brooklyn, in the county of Kings and State of New York, have invented certain new and useful Improvements in Correction Devices for Repeater Compasses, of which the following is a specification.

This invention relates to devices for correcting the readings of gyroscopic compasses when used on moving objects such as ships. This application has certain features in common with my copending application on Gyroscopic navigational apparatus, Serial No. 634,595, filed June 21, 1911, patented February 5, 1918, Patent No. 1,255,480, and to that extent is a continuation thereof.

As explained in said application, a deflection of a gyroscopic compass occurs on ships which is affected by at least three variables; first, the speed of the ship; second, the heading or course of the ship, and third, the latitude of the ship.

The relation between these variables is expressed in the following equation:

$$\tan C = \frac{K \cos H}{E \cos L} = C$$

(where the angle C is small) where K = linear speed of the ship, H, the angle, the ship's heading or course makes with the true geographical north, E the linear velocity on the equator and L the latitude.

When a device is used in connection with a compass employing an independent pendulum having an eccentric connection with the compass to impart ballistic thereto and at the same time suppress the oscillation thereof, a third correction is needed as explained in said application, which is expressed by the following equation:

Where D represents the total correction $$D = \frac{A \cos H}{\cos L} \pm B \tan L$$

where A and B are constants of the individual instruments.

Referring to the drawings in which what I now consider to be the preferred forms of my invention are shown:

Fig. 2 is a similar view of a second form of repeater compass.

Fig. 3 is a side elevation, partly in section, thereof, the card being shown as turned through 90° from Fig. 2 to show the inclination of the cosine ring.

Fig. 4 is a plan view of the form of master or gyroscopic compass adapted to be used with the form of repeater compass shown in Fig. 1.

Fig. 5 is a corresponding view of the master compass designed to be used with the repeater compass of Fig. 2.

Figure 8:
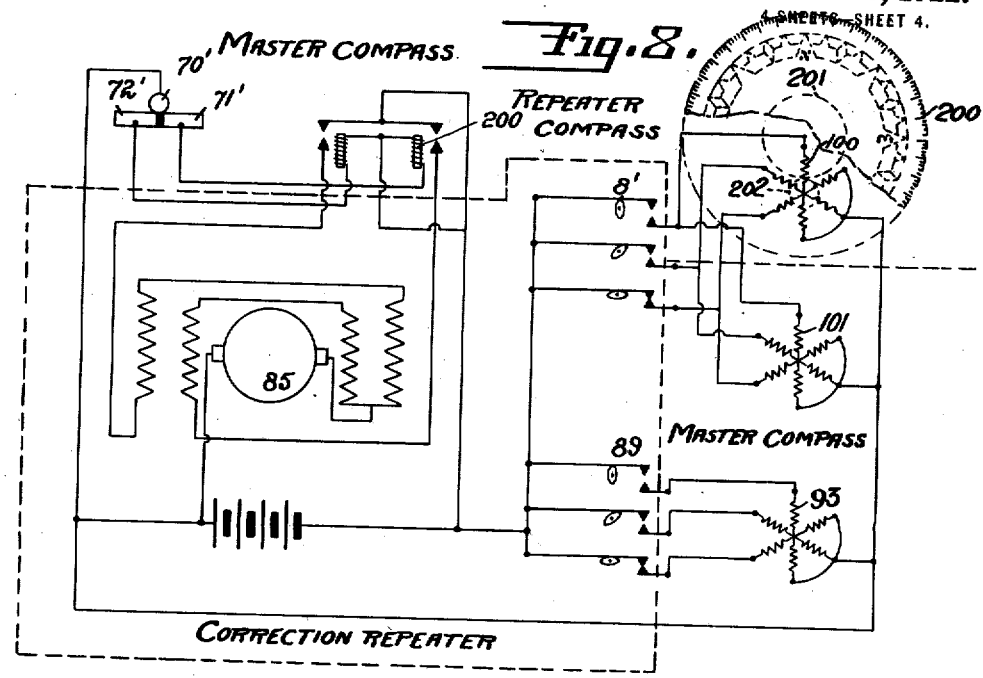
Fig. 8 is a wiring diagram of the form of the invention shown in Figs. 2, 3 and 5.

Fig. 8ª is a wiring diagram of a different form of the invention.

Figure 9:
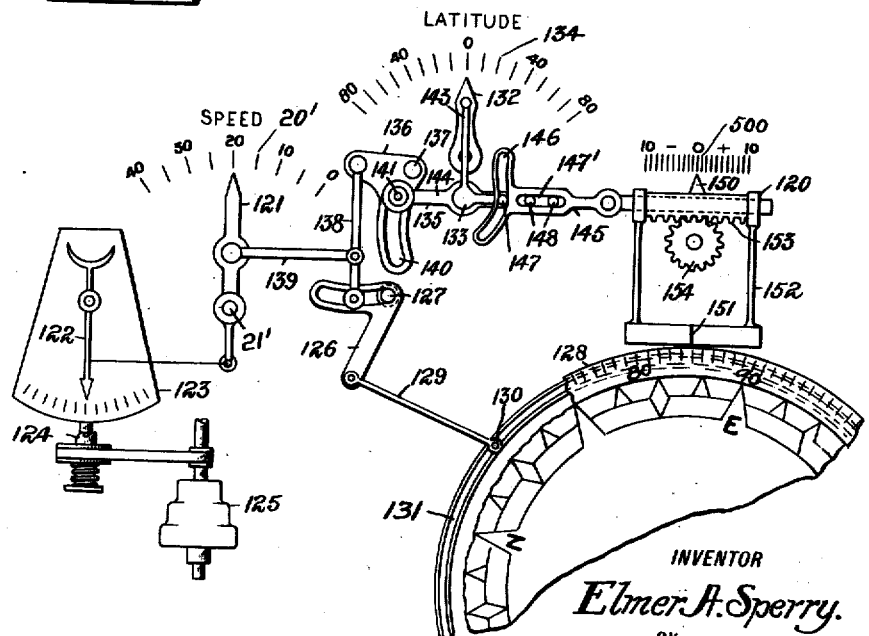

Fig. 9 is a diagrammatic view of a second form of the correction device either for a repeater or dummy compass or for a gyroscopic compass.

Fig. 10 is a detail of a portion of the mechanism shown in Fig. 5.

Figure 1:
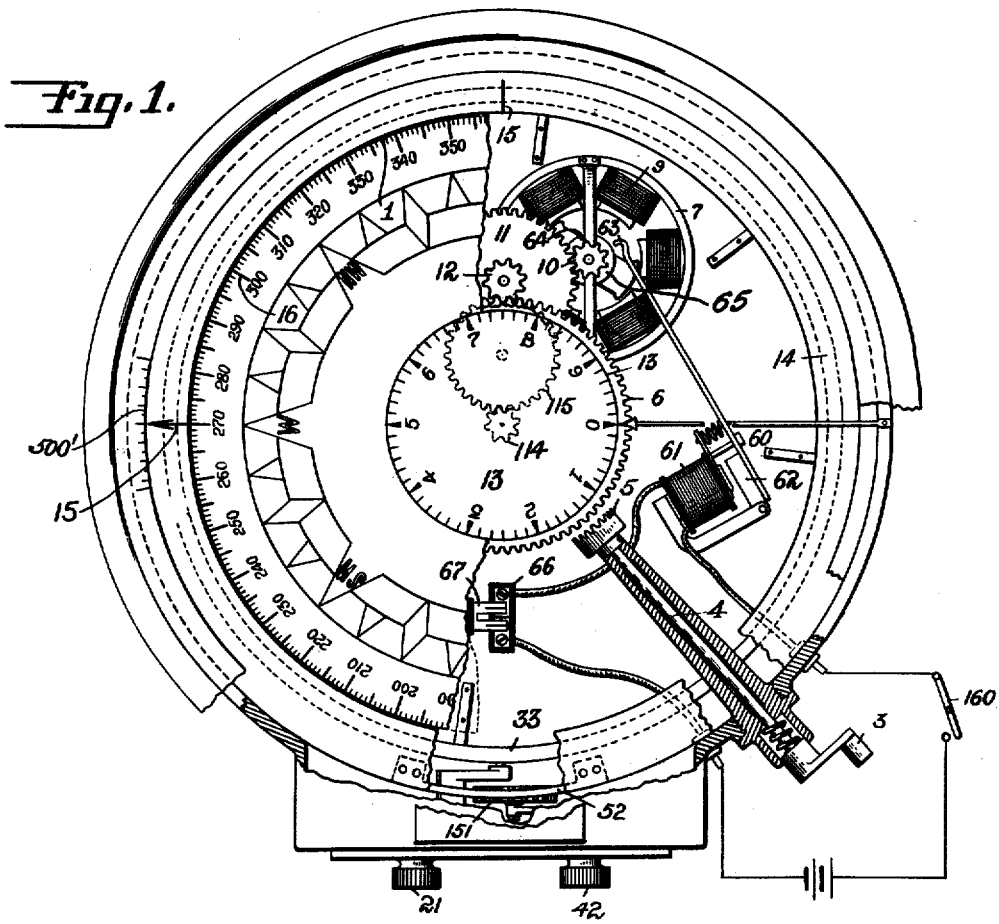
Fig. 1 is a plan view of one form of dummy or repeater compass constructed according to my invention with parts thereof broken away to illustrate the interior mechanism.

According to this invention instead of applying the correction directly to the master compass I prefer to use a separate dummy or repeater compass on which the correction to be applied may be computed or indicated. Such an instrument is illustrated in Fig. 1 in which the rotatable card 1 is adapted to be set to correspond to the readings of the master compass 2 shown in Fig. 4. The setting of the card may be effected by hand if desired, through a handle 3 which is shown as secured to a stem 4 on the inner end of which is a crown gear 5 adapted to mesh with gear 6. The said gear may be secured to the underside of the card 1 so that on rotating the handle the card may be set in a predetermined position.

In addition to or in place of said hand setting means I prefer to provide an automatic means for maintaining the card in synchronism with the master compass. For this purpose I have shown a step-by-step repeater motor 7 adapted to be driven from a plurality of contacts 8 on the master compass, the said contacts being in the form of a transmitter, adapted to excite the stationary field windings 9 of the repeater motor in succession in the well known manner (see Fig. 8ᵃ). Said repeater motor is shown as provided with a pinion 10 meshing with a gear 11 on the shaft of which is mounted a second pinion 12 meshing with the aforesaid gear 6. If desired, a second card 13 may be provided to rotate at much higher speed than card 1 for indicating accurately small subdivisions. The card 13 is shown as driven from the pinion 114 meshing with idler 115 which in turn is driven from pinion 12.

In order to effect the correction I prefer to shift the relatively stationary member or ring 14 which carries the index mark or markings 15 on which the graduations 16 on the compass card are readable. It is, of course, obvious that the graduations may be borne by either one or both of the members 1 or 13. The ring 14 bears the markings or indices 15 which may serve as the real or apparent lubbers line of the ship. Means are provided to shift the said ring an amount sufficient to correct for the error due to the speed and latitude of the ship.

In order to so shift the said ring I may employ any suitable linkage to introduce the corrections in whole or in part indicated in the above equation. One form of such linkage is shown in Fig. 9, this form being as illustrated by the aforesaid application and being more or less diagrammatically illustrated. The resultant movement from the several pieces of mechanism employed to perform the several component corrections is imparted to a bar 120 hereinafter sometimes termed, for convenience, a correction device, a correction member, or a device for indicating compass corrections. The speed correction varies as a direct function of the speed, as indicated in the formula, and is brought about by means of a pointer 121 which is pivoted at 21' and cooperates with a speed scale 20'. This pointer may either be adjusted by hand, after the speed has been ascertained in any known manner, or may be automatically adjusted by being connected to the pointer 122 of a tachometer 123 driven, preferably in one direction only as indicated by the ratchet 124 from the ship's engine or turbine 125. Pointer 121 is connected through a link 139 to an upright lever 138, hereinafter referred to.

The course correction varies as a trigonometrical function (the cosine) of the meridional component of the course or heading, as indicated in the equation, and is introduced by means of a bent lever 126 pivotally supported at 127—said lever being suitably connected to and controlled by a movable indicator 128 of course or heading which may or may not be actuated directly as a part of the gyro-compass. The said lever is shown as connected to a link 129 having a pin or roller 130 working in grooved ring 131 which is mounted to move with the compass card and is arranged slightly eccentric thereto, whereby movement of the card about its center causes the arm to swing about pivot 127 on account of the eccentricity of the ring. The latitude correction is also a trigonometrical function (the cosine) of the latitude, as indicated by the formula, and is performed or introduced by the pointer 132 and cooperating with a latitude scale 134 graduated according to cosines of latitude. The latitude correction is impressed upon the other two corrections before they reach the bar 120 by means of the link 135, which connects the bent lever 136 with the said bar. The bent lever 136 is pivoted at 137 and is actuated by the link 138 described above. It is also formed with a curved slot 140 in which works slidably a pin 141 on one end of the link 135. The link 135 is connected to the pointer 132 by means of the link 143 pivoted at 133. It will be understood that when the pointer 132 is adjusted for various latitudes, the link 143 moves 135 about the end remote from the pin 141 and causes this pin to move in the slot of the lever 140. Hence the combined course and speed corrections transmitted to the bar 120 by the link 135 have superimposed on them the latitude cosine correction.

In order to introduce the plus or minus tangent of latitude correction, the link 135 is formed in two relatively slidable parts 144 and 145, the latter being formed with the transverse curved slot 146, and a longitudinal slot 147', while the former is formed with a plurality of pins 148 engaging in said slot 147' so as to hold the two parts in alignment and at the same time permit longitudinal adjustment. Also the link 143 is formed with a bent arm having a pin 147 thereon engaging in the said slot 146. In this way any latitude adjustment of the pointer 132 causes a lengthening or shortening of the compound link 135 and the shape of the slot 146 is such that this lengthening or shortening introduces a correcting movement proportional to the tangent of the north or south latitude respectively.

From the foregoing it is evident that all the various corrections corresponding to different factors of travel of the ship or other vehicle are combined into one movement, which is impressed on the bar or correction device 120. This bar is shown as furnished with a pointer 150 co-operating with a scale 500, so that the total correction to be applied to the main compass reading can be ascertained merely by inspection, no calculations or reference to tables being necessary. The bar 120 is shown as connected to the shiftable lubber's line index 151 by means of legs 152.

In order that the corrected readings may be transmitted to one or more distant repeater compasses, bar 120 may be formed as a rack 153, the teeth of which gear with the pinion 154 forming part of a commutator switch such as hereinafter described for transmitting the corrected readings.

My preferred form of mechanism for accomplishing this result, however, is shown in Figs. 1, 2, 3, 6 and 7 in which 20 is a rotatable disc having a knurled knob 21 thereon. Said disc is mounted in a second rotatable disc or cup 22 and bears on its under surface a spiral slot 23. Disc 20 is provided with speed graduations 27 while the cup 22 is provided with index 28, (see Fig. 3). The said cup has also therein a curved slot 24, while a pin 25 on a link 26 works in both the slots 24 and 23. Secured to said cup is an arm 29 journaled at 30 in a fixed bracket 31. The said arm is provided with a roller 32 adapted to be guided in a track guideway or cam ring 33 secured to the rotatable card 1. Said link 26 is pivoted adjacent its other end to a small bell crank lever 34 pivoted at 35 on a disc or cup 36 similar to cup 22. The other end of said lever 34 carries a pin 37 which works in slot 38 in said disc. The said disc 36 may be provided with a bracket 40 secured thereto and journaled in a fixed bracket 41' for the purpose of providing the disc with a bearing. Rotatably mounted within a depression in said disc is a second disc 41 having a knob 42 thereon and slots 43 and 44 therein. Said pin 37 engages the last named slot through the slot 38 in disc 36. Disc 36 also contains a slot 45 in which is slidably mounted a pin 46 on lever 47, said pin also engaging the double M shaped slot 43. Lever 47 is shown as pivoted adjacent its other end to a gear sector 151 pivoted at 51 to the fixed frame. Said gear sector meshes with an annular gear 52 (see Fig. 3) so that as the sector is oscillated the annular gear is rotated and carries with it ring 14 to which it is attached.

It will readily be seen that, with the proper layout of the slots 23 and 24, adjustment of knob 21 will move the link 26 an amount proportional to the speed of the ship. This speed is resolved in the direction of the heading of the ship automatically by means of cam ring 32 and arm 29, which turn cup 22 and disc 20 together. Correspondingly it will be seen that adjustment of knob 42 will move lever 47 an amount proportional to a function of the latitude of the ship. Also that the first named quantity (i. e., the proper function of the ship's velocity or combined speed and heading) will be multiplied (or divided) by the second since movement of the speed and course adjustments will impart movement to link 47 by means of link 26. It should be noted that the velocity adjustment will not throw out the latitude adjustment a material amount since both the latitude discs are turned together by the adjustment of the velocity and hence the reading of the graduations 55 on the index 56 is not altered. The bell crank lever 34 together with the slots 38 and 44 are provided to add to the result a function (tangent) of the latitude indicated by the equation. The markings 15 on the ring 14 may be read in connection with a fixed scale 500' to show the correction applied as well as on the compass card.

In connection with the repeater compass, I may, if desired, provide an electro-magnetic device 60 adapted to assist in the setting of the instrument from a distance. When excited the electromagnet 61 attracts armature 62 so that the finger 63 thereon will engage a notch 64 in a collar 65 on the motor shaft when it is rotated under the finger. The electro-magnet is preferably placed in circuit with contacts 66 and 67 on a stationary part and on the rotatable card 1 respectively in addition to being placed in circuit with the actuating circuit closure 160 near the master compass so that the card will always be locked in a predetermined position.

As above stated the master compass from which said repeater is actuated is illustrated more or less digrammatically in Fig. 4. In said Fig., 73 represents the casing of the gyroscope proper which is suspended or supported from a follow-up member 68 rotatably mounted within frame 168. The said gyroscopic unit is preferably provided with an upwardly extending post 69 carrying a brush or trolley 70 which rolls on a plurality of contacts 71 and 72 secured to the follow-up member. The said contacts control a reversible motor 79 geared through reducing gears 80 to gear 81 on the follow-up support, (see Fig. 8ª). By this or similar means the member 68 is maintained in the same position in azimuth that the gyroscopic unit maintains. The aforementioned transmitter 8 is preferably geared to said gear 81 through pinion 82.

Figure 6:
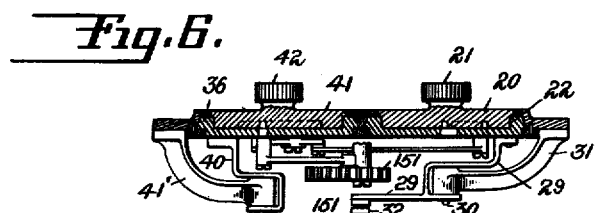
Fig. 6 is a transverse section of the correction device on an approximate line 6—6 of Fig. 3.
Figure 7:
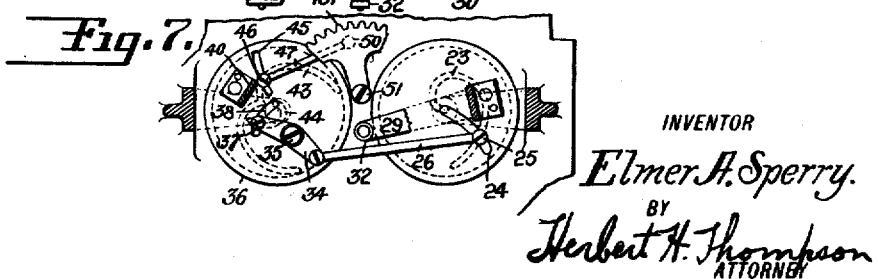
Fig. 7 is a rear elevation of said device.

Referring now to Figs. 2, 3, 5 and 8, the same form of correction device is illustrated in these figures as in Figs. 1, 6 and 7. According to this modification, however, the repeater card 1' is driven from a reversible motor 85 instead of from a step-by-step repeater motor, the said motor being placed in circuit through a relay 200 with reversing contacts 70' 71' and 72' on the master compass 2'. The said motor may drive the card 1' through reduction gearing 86 similar in form to that employed with repeater motor 7. The said card may also be provided with a gear 87 and has connected thereto a ring 33' similar in form to the ring 33. Said gear 87 serves to drive one or more transmitters 8' and 89 through pinions 90 thereon. Transmitter 89 is shown as fixed to the casing 91 of the repeater compass so that it will transmit the true movements of the compass dial. Transmitter 8' on the other hand is shown as mounted on the shiftable lubbers ring 14' so that it will transmit the corrected readings of the compass. Transmitter 89 is placed in circuit with a repeater motor 93 adapted to drive either directly or indirectly the follow-up support 68' of the master compass. The repeater motor is shown as carrying pinion 94 meshing with the large gear 81' on said support. Transmitter 8' is adapted to drive one or more repeater motors 100 (Fig. 8) in simplified repeater compass or compasses 100' so that each repeater compass will indicate the correct reading. Said motor may be in all respects identical with motor 7 and is illustrated as driving the repeater card 200 through gear 201 and pinion 202. From said transmitter, I may also drive a repeater motor 101 on the master compass. Said motor is geared through beveled gears 102 to one arm 103 of a differential gear train 104. The opposite arm 105 of said train may be similarly driven by bevel gears 102' from said repeater motor 93 (see Fig. 10). The central arm 106 of said train is provided with an annular spur gear 107 which meshes with gear sector 108. Said sector is shown as a part of a bell crank lever 109 pivoted at 110, the upstanding arm of which carries a second gear sector 111 which meshes with an annular gear 112 on the under surface of the shiftable lubbers line ring 113.

It will readily be seen that by means of this differential gear train, the lubbers line ring 113 will be moved an amount equal to the difference between the movement of transmitters 89 and 8' or in other words, an amount equal to the movement of shiftable lubbers line 14' so that the correct readings will also be shown on the master compass.

The operation of the preferred form of my invention is as follows:

The repeater compass shown in Fig. 2 for instance, having been connected up with a master gyroscopic compass, will retain the same relative position in azimuth, since reversible motor 85 will not only actuate the repeater card, but also transmitter 89, thereby causing the follow-up member 68' of the compass to follow the gyroscope 73 by means of repeater motor 93.

In order to set the correction device, the navigator simply turns the knobs 21—42 until the respective dials register the speed of the ship and the approximate latitude. This will automatically adjust the lubber's ring 14' through the system of slots and linkage already described so that the corrected heading of the ship will be obtained. If the ship should turn in azimuth the repeater card 1' will be turned also, and thereby the cam ring 33' will cause a new adjustment of the ring 14' so that the correct readings are shown for all headings without the change of compass cards or reference to printed tables.

One or more repeater compasses may be actuated from the transmitter 8' to indicate at various parts of the ship the corrected readings. At the same time the lubber's ring 113 on the master compass may be shifted by means of the repeater motor 101 in circuit with transmitter 8' and the differential gearing already described so that the corrected readings are also shown on the master compass.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In gyro-navigational apparatus, an azimuth indicator including a member rotatable about an axis and a relatively stationary member conjointly readable, means eccentric to said axis and carried by said rotatable member, and mechanism actuated by said means for shifting said stationary member to correct the readings of the indicator.

2. In gyro-navigational apparatus, an azimuth indicator including a member rotatable about an axis, means eccentric to said axis and carried by said rotatable member, a device for correcting the apparent readings of the indicator, and mechanism actuated by said means for operating said correcting device.

3. The combination with a gyro-compass and electrical transmitting means associated therewith, of a repeater compass comprising a motor therein driven from said means, a card driven by said motor, a shiftable reference index for said card, and mechanism actuated by rotation of the card for shifting said index.

4. The combination with a gyro-compass having a compass card, a shiftable reference index and a transmitting means associated therewith, of a repeater compass comprising a motor controlled from said means, a repeater card driven by said motor, a shiftable reference index for said repeater card, mechanism actuated by the rotation of the repeater card for shifting the repeater index and electrical means connecting said reference index with the index on the gyro compass for causing a corresponding change in its position.

5. In gyro-navigational apparatus for ships, a gyro-compass comprising a gyroscopic element, a follow-up member, reversing contacts actuated by the relative movement of said element and member, a reversible motive means actuated from said contacts, a course indicator driven thereby, a transmitter also driven by said motor, a shiftable index for said indicator, means for shifting said index, a second transmitter mounted so as to receive the combined movements of said indicator and index and adapted to actuate other repeater compasses, and a repeater-motor mounted on said gyro-compass to cause rotation of said follow-up member and in circuit with said first transmitter.

6. In gyro-navigational apparatus for ships, a gyro-compass comprising a gyroscopic element, a follow-up azimuth indicating member, a shiftable index therefor, reversing contacts on said element and member, a reversible motive means actuated from said contacts, a course indicator driven thereby, a transmitter also driven by said motor, a shiftable index for said indicator, means for shifting said index, a second transmitter mounted so as to receive the combined movements of said indicator and index and adapted to actuate other repeater compasses, a repeater-motor mounted on said gyro-compass to cause rotation of said follow-up member and in circuit with said first transmitter, and a second repeater motor mounted on said compass and in circuit with said second transmitter, and means interconnecting said two motors and the gyro-compass index for causing it to reproduce the movements of the indicator index.

7. In gyro-navigational apparatus, a gyro-compass comprising a gyroscopic element, a follow-up element, cooperating reversing contacts actuated by the relative movement of said two elements and a repeater motor for driving said follow-up element, in combination with an independent repeating instrument comprising a reversible motor driven from said contacts, and a plurality of transmitters driven therefrom and adapted to drive said repeater motor and other repeater instruments.

8. In a navigational system, the combination with a master compass, of a repeater compass electrically actuated therefrom, and a correction device separate from both of said compasses and interposed between the same for introducing a correction in accordance with the heading of the ship.

9. In a navigational system, the combination with a master compass, of a repeater compass electrically actuated therefrom and a correction device separate from both of said compasses and interposed between the same for introducing a correction to be applied to the readings of the repeater compass.

10. In a repeating system, a sending instrument comprising a pair of rotary indicators, a transmitter driven by one of said indicators, and a second transmitter driven by the combined movements of the two indicators, in combination with a master compass comprising a repeater motor driven from each transmitter, an indicator driven from one of said motors, differential connections between said two motors and a cooperating indicator driven from said connections.

11. The combination with a direction-responsive instrument having a primary element and a follow-up element, of reversing contacts actuated by said elements, a reversible motor electrically connected thereto, a correction mechanism, a transmitter driven from said motor and mechanism, a repeater motor carried by said instrument and connected with said transmitter, said transmitter being also adapted to drive one or more repeater compasses.

12. In a navigational system, the combination with a master compass, of a repeater compass electrically actuated therefrom, and a correction device separate from both of said compasses and interposed between the same for introducing a correction in accordance with the heading and speed of the ship.

13. In a navigational system, the combination with a master compass, of a repeater compass electrically actuated therefrom, and a correction device separate from both of said compasses and interposed between the same for introducing a correction in accordance with the heading, speed and latitude of the ship.

14. The combination with a gyro-compass, having a sensitive element of a follow up device therefor, transmitting means operated by relative movement between said element and device, a correction repeater operable by said means, a repeater compass, and transmitting means operated by said correction repeater for transmitting corrected readings to the repeater compass.

15. The combination with a gyro-compass, of transmitting means operable thereby, a correction repeater operable by said means, a repeater compass, and transmitting means operated by said correction repeater for transmitting corrected readings to the repeater compass.

16. In gyro-navigational apparatus for ships, a gyro-compass comprising a gyroscopic element, a follow-up member, contacts operated by relative movement of said element and member, a reversible motive means actuated from said contacts, a transmitter driven by said means and a repeater motor actuated by said transmitter and connected to said member to cause it to follow said element.

17. In gyro-navigational apparatus for ships, a gyro-compass comprising a gyroscopic element, a follow-up member, contacts operated by relative movement of said element and member, a reversible motive means actuated from said contacts, one or more transmitters driven by said means, a repeater motor actuated by one of said transmitters and connected to said member to cause it to follow said element, at least one of said transmitters being adapted to drive one or more repeater compasses.

18. The combination with a master gyro compass adapted to drive repeater compasses, of a sensitive element of the gyroscopic compass mounted for rotation about a vertical axis, a follow-up member rotatably mounted about said axis adjacent thereto, a controller operated by relative rotation of said element and member about said axis, a reversible motive means actuated by said controller, a transmitter driven by said means, a repeater motor actuated by said transmitter and connected to said member to cause it to follow said element, said motive means also serving to drive one or more repeater compasses.

19. In a gyro compass repeating system the combination of a master compass, means associated with said compass adapted to transmit indications thereof; means controlled by said transmitting means, adapted to reproduce said indications; means adapted to re-transmit indications from said reproducing means; connecting means between said reproducing means and said re-transmitting means, whereby the retransmitted indications are automatically corrected for errors in the indications of the master compass due to the speed, latitude and heading of the ship; and means controlled by said re-transmitting means for reproducing said corrected indications.

In testimony whereof I have affixed my signature.

ELMER A. SPERRY.